(12) United States Patent
Sundhar

(10) Patent No.: US 6,201,858 B1
(45) Date of Patent: Mar. 13, 2001

(54) MULTIPLE TERMINAL MESSAGE INDICATOR FOR A TELECOMMUNICATIONS NETWORK

(75) Inventor: Kalyan R. Sundhar, Cary, NC (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 08/992,254

(22) Filed: Dec. 17, 1997

(51) Int. Cl.$^7$ .................................................. H04M 1/64
(52) U.S. Cl. .................................. 379/88.12; 379/88.11
(58) Field of Search ............................... 379/88.12, 904, 379/911, 88.13, 88.14, 88.17, 88.25, 88.26, 88.11, 210, 211, 212, 213

(56) References Cited

U.S. PATENT DOCUMENTS

| | | | |
|---|---|---|---|
| 5,463,676 | * 10/1995 | Ohsawa | 379/88.12 |
| 5,515,426 | * 5/1996 | Yacenda et al. | 379/211 |
| 5,675,507 | 10/1997 | Bobo, II | 364/514 |
| 5,742,905 | * 4/1998 | Pepe et al. | 379/210 X |
| 6,002,750 | * 12/1999 | Ertz | 379/88.12 |

OTHER PUBLICATIONS

G. Vaudreuil, "Voice Profile for Internet Mail," Octel Network Services, Network Working Group, Request for Comments: 1911, Category: Experimental (Feb. 1996), pp. 1–22.

"Interface Description—Interface Between Customer Premise Equipment; Simplified Message Desk and Switching System: IAESS™," Bell Communications Research, Inc., Technical Reference TR–TSY–000283, Issue 1 (Jul. 1985), 10 pages.

* cited by examiner

Primary Examiner—Scott L. Weaver
(74) Attorney, Agent, or Firm—Finnegan, Henderson, Farabow, Garrett & Dunner, L.L.P.

(57) ABSTRACT

An apparatus for providing indications of a phone subscriber's messages at multiple phones. After a caller records a message, the system provides indications of the pending message at all of a subscriber's phones or at a group of the subscribers phones. The apparatus may also provide different types of message indicators to indicate which phone originates the call resulting in the message.

19 Claims, 2 Drawing Sheets

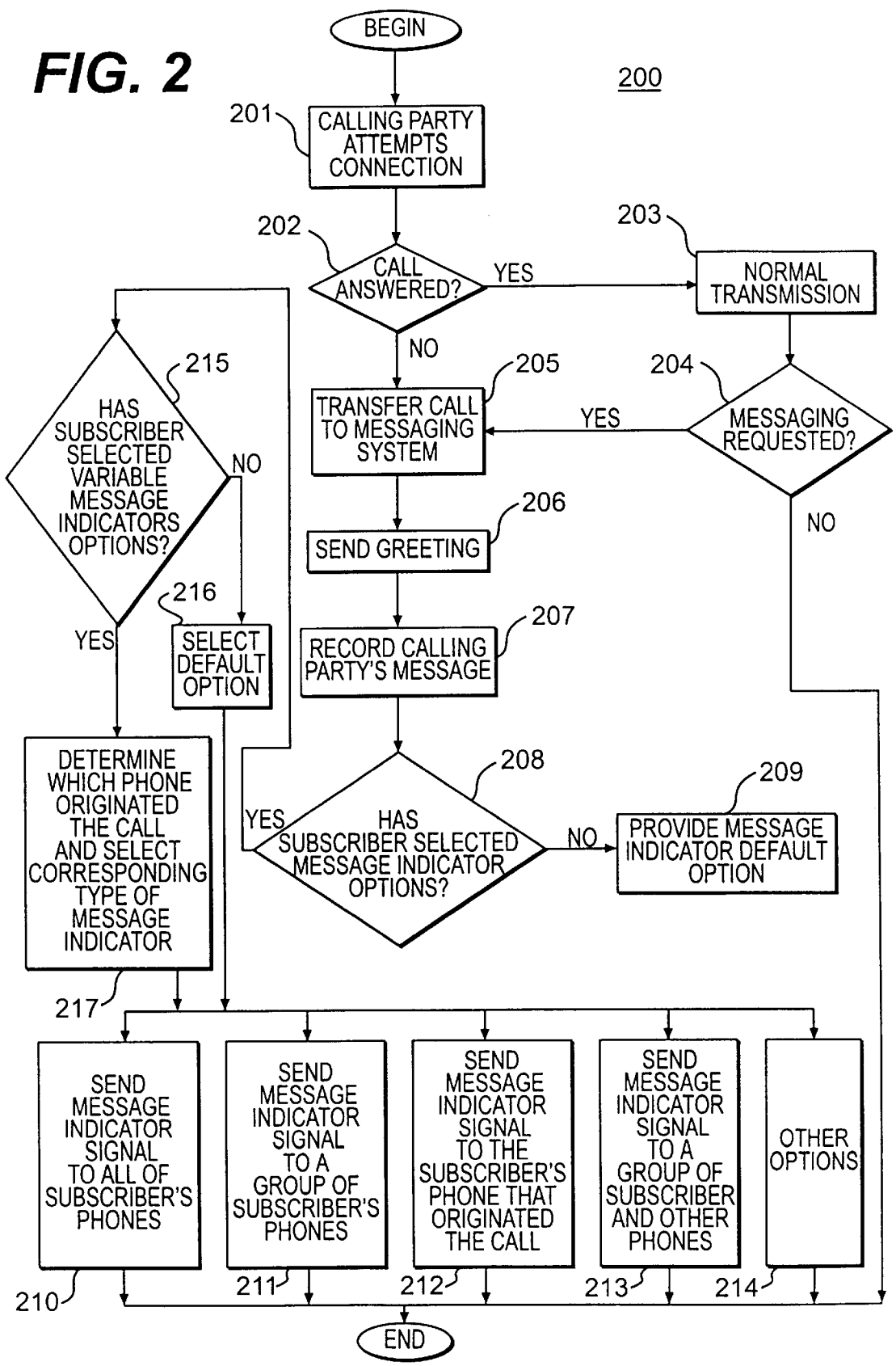

MULTIPLE TERMINAL MESSAGE INDICATOR FOR A TELECOMMUNICATIONS NETWORK

FIELD OF THE INVENTION

The present invention relates to an apparatus and method of providing indications of a phone subscriber's messages at multiple terminals.

BACKGROUND OF THE INVENTION

Phone subscribers usually have more than one phone. For example, a subscriber typically has both a home phone and an office phone, and many subscribers have other phones such as cellular or car phones. The different phones for a particular subscriber often have different voice mail systems, such as one voice mail system for an office phone and another for a home phone.

In a traditional voice mail system, a subscriber receives an indication of a pending message at the terminal or phone that was called. For example, if a caller leaves a voice mail message at a subscriber's office phone, the subscriber receives an indication of the pending message at only the office phone. Likewise, if a caller leaves a message when calling a subscriber's home phone, the subscriber receives an indication of the pending message at only the home phone. Because subscribers only receive message indicators at the phone that was called, they may experience a delay in receiving indications of their pending messages. Thus, they may not know that they have a message unless, for example, they are physically present at their phone. It is often possible for a subscriber to call a particular voice mail system to check for pending messages. However, that option may inconvenience subscribers, particularly if they are associated with multiple voice mail systems.

Accordingly, a need exists for an improved system for providing indications of messages to a subscriber having multiple phones.

SUMMARY OF THE INVENTION

An apparatus consistent with the present invention receives a message for a phone subscriber associated with a plurality of phones. The apparatus provides an indication of the message at each phone within a group of the phones associated with the subscriber.

Another apparatus consistent with the present invention receives a message for a phone subscriber associated with a first phone and a second phone. The apparatus provides a first type of indication at the first and second phones if the first phone originated a call resulting in the message, and it provides a second type of indication at the first and second phones if the second phone originated the call resulting in the message.

A method consistent with the present invention receives a message for a phone subscriber associated with a plurality of phones and provides an indication of the message at each phone within a group of the phones associated with the subscriber. Another method consistent with the present invention receives a message for a phone subscriber associated with a first phone and a second phone. The method provides a first type of indication at the first and second phones if the first phone originated a call resulting in the message, and it provides a second type of indication at the first and second phones if the second phone originated the call resulting in the message.

BRIEF DESCRIPTION OF THE DRAWINGS

FIG. 2 is a flow chart of a process for providing indications of messages to a subscriber having multiple phones.

DETAILED DESCRIPTION

Figure 1:
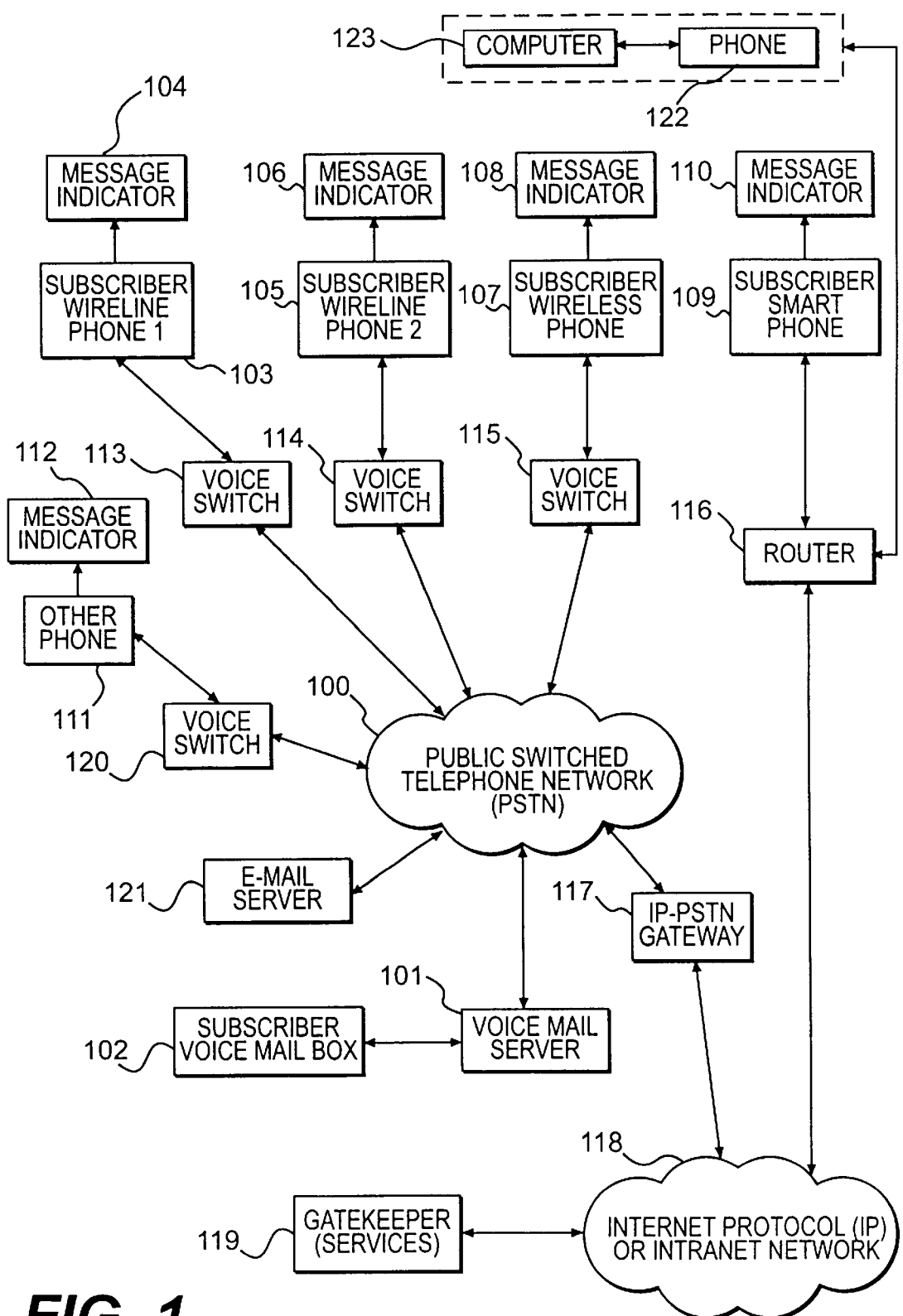
FIG. 1 is a diagram of a telecommunications network including multiple phones for a particular subscriber.

A system consistent with the present invention provides message indicators at one or more phones for a particular subscriber or other person. For example, when a subscriber receives a voice mail or other message, each of the subscriber's phones typically provides an indication of the pending message. Therefore, no matter which phone a subscriber uses, he or she will receive an indication of the pending message. Alternatively, subscribers may elect to receive message indicators at only some phones, optionally including phones for other subscribers. For example, a subscriber may elect to have message indicators provided at a phone that was called and always to their office phone. Accordingly, such a system provides an advantage of permitting phone subscribers to more easily determine if they have any pending voice mail or other messages.

Telecommunications Network

FIG. 1 is a diagram of a telecommunications network including multiple phones for a particular subscriber. A network 100, such as a public switched telephone network (PSTN), is interfaced with a voice mail server 101 having an associated subscriber voice mail box 102. A voice mail server is an example of a messaging system. E-mail servers, such as e-mail server 121, interfaced with PSTN 100, may also provide for messaging, particularly for phones that have an associated computer. Messaging systems include any system capable of recording real-time information for subsequent play back.

PSTN 100 is interfaced with multiple phones for a particular subscriber. These phones may include a subscriber wireline phones 103 and 105, such as conventional office and home phones, interfaced through voice switches 113 and 114, respectively. These phones may also include a subscriber wireless phone 107, such as a cellular or car phone, interfaced through voice switch 115. In addition, they may include a subscriber phone 109, such as a smart phone, interfaced through router 116 to an Internet protocol (IP) or intranet network 118. A smart phone is a phone having a microprocessor for performing functions necessary to interface with a router. Other types of phones include a phone 122 and associated computer 123 interfaced with IP network 118 through router 116. The word "phone" is intended to encompass any device for electronically transmitting voice or other real-time information, the device possibly including an associated computer.

PSTN 100 is also interfaced with IP network 118 through an IP-PSTN gateway 117 for communicating with phones through that network. IP network 118 includes a gatekeeper 119 for providing phone-related services such as call waiting. PSTN 100, or IP network 118, also includes other subscriber's phones, such as phone 111 interfaced through voice switch 120.

Each subscriber phone typically has an associated message indicator for providing an indication of a pending message. These indicators include message indicators 104, 106, 108, and 110 for phones 103, 105, 107, and 109, respectively. Other subscribers typically have message indicators as well, including message indicator 112 for phone 111. The message indicators may provide a visual indication of a pending message, an audible indication, or both visual and audible indications. For example, the message indicators may provide a constant or flashing light, or they may provide an initial stutter dial tone.

The following are examples of products for implementing various components shown in FIG. 1. Voice mail servers include the Meridian® Mail product by Northern Telecom, Inc. E-mail servers are known in the art and include various applications for computers. Voice switches include the Northern Telecom DMS-100™ product. Routers include the Cisco 3600 product. Gatekeepers and IP-PSTN gateways include those products meeting the International Telecommunication Union (ITU) H.323 standard. An IP protocol for voice mail systems to send messages over the Internet is known as Voice Profile for Internet Mail (VPIM) and is described in the following publication, which is incorporated herein by reference: G. Vaudreuil, "Voice Profile for Internet Mail," Octel Network Services, Network Working Group, Request for Comments: 1911, Category: Experimental (February 1996).

Process for Providing Indications of Messages

FIG. 2 is a flow chart of a process for providing an indication of a pending message at multiple phones. A calling party attempts connection with one of the subscriber's phones (step 201). If the call is answered (step 202), normal transmission occurs involving a real-time phone connection (step 203). If the call was not answered, the phone typically transfers it to a messaging system, such as a voice mail server, for the subscriber (step 205). In addition, a caller may request to transfer to a messaging system during a real-time phone connection (step 204). Once the caller is transferred to the messaging system, it typically sends a greeting (step 206), which may include a standard voice mail-type greeting instructing the caller to leave a message. The system then records the calling party's message (step 207), which may include any type of real-time information such as voice, video, audio, or control signal information. Messages including visual components such as video or display data may be useful for messaging systems accessible by a computer for displaying that information.

The system then determines if the subscriber has selected message indicator options (step 208). If no options have been selected, the system provides a message indicator default option (step 209), determined by a particular system. Otherwise, the system provides message indicators in accordance with the subscriber's selected option, alternatively with other options described below. These message indicator options include sending a message indicator signal to all of the subscriber's phones (step 210), sending a message indicator signal to a group of the subscriber's phones (step 211), sending a message indicator signal to the subscriber's phone that originated the call (meaning the phone that was called) (step 212), sending a message indicator signal to a group of the subscriber and other phones (step 213), or other options (step 214).

Examples of signals and protocols for providing message indicators at phones are described in the following publication, which is incorporated herein by reference: "Interface Description—Interface Between Customer Premise Equipment; Simplified Message Desk and Switching System: 1AESS™," Bell Communications Research, Inc., Technical Reference TR-TSY-000283, Issue 1 (July 1985).

The system typically stores information associated with particular subscribers, including information identifying which phone receives message indicator signals for the options in steps 209–214. In particular, for the option of step 210, the system typically stores information identifying all phones associated with a particular subscriber so that, upon recording a message, the system may access that information to determine where to transmit the message indicator signals. For the options of steps 211 and 213, the system may permit the subscriber at a set-up or other time to identify the phones that he or she wants to provide indications of messages. The system typically stores that information associated with the subscriber and thus may access that information to determine where to transmit the message indicator signals.

The options defined in steps 211 and 213 also provide for a subscriber to more particularly establish priority of messages. For example, a subscriber may elect to have message indicators provided to the phone that originated the call and to a home phone. Therefore, the subscriber at a home phone receives indications of pending messages originating from any of the phones, but at other phones receives only indications of messages originating from those phones. The option defined in step 213 provides for subscribers to elect to have another person receive an indication of their messages, which may be useful if they permit others to access and check their messages for them.

In addition to providing message indicators at selected phones, the system may provide different types of indicators in steps 210–214 to provide an indication of which phone originated the call. If those options exist, the system determines if the subscriber has selected variable message indicator options (step 215). If not, the system selects a default option (step 216), typically providing the same message indicator regardless of which phone originated the call.

Otherwise, the system determines which phone originated the call and selects the corresponding type of message indicator (step 217), and in one of steps 210–214, it provides the selected message indicator at the selected phones. For example, it may provide a flashing light to indicate that a subscriber's office phone originated the call and provide a constant light to indicate that any of the other subscriber's phones originated the call. A system having one or more voice mail boxes for a subscriber may implement this alternative option to provide an indication of which voice mail box to access or, if the subscriber only has one voice mail box, to provide an indication of which phone was called.

With respect to FIG. 1, the processing shown in FIG. 2 may occur between phones in PSTN 100, phones in IP network 118, or between a phone in PSTN 100 and another in IP network 118. When the called party's phone sends the greeting (step 206), the phone typically accesses a corresponding voice mail server or other messaging system for providing the recorded greeting. If the interface is through PSTN 100, for example, a phone provides a connection with voice mail server 101, or other messaging system, for providing a corresponding recorded greeting. If the connection is through IP network 118, a phone provides a connection through IP-PSTN gateway 117 and PSTN 100 to voice mail server 101, or other messaging system, for providing the recorded greeting. Alternatively, the phone itself, such as smart phone 109, may provide the greeting. In addition, a voice mail server or other messaging system may interface directly with IP network 118 for providing voice mail service to a subscriber.

After the calling party records the message (step 207), the corresponding voice mail server or other messaging system then sends message indicator signals to the selected phones. It may send the message indicator signals through PSTN 100 and IP network 118 for phones interfaced with those networks. Based upon the option selected (steps 209–214), the system sends message indicator signals to the corresponding phones to provide an indication of a pending message. These signals may, for example, activate a light on the corresponding phone or provide an initial stutter dial tone at the phone. It is possible that more than one voice mail server or other messaging system provides service to the same subscriber according to the processing shown in FIG. 2. However, unless they both access the same subscriber voice mail box, a subscriber may have to check two different voice mail boxes to receive a pending message.

The processing shown in FIG. 2 and described above may be implemented in software in voice mail server 101 or other messaging system and within software in other components in the network for controlling a corresponding phone, including its message indicators. If the connection involves a phone interfaced with PSTN 100, the corresponding voice switch may contain software for performing the necessary processing in conjunction with a voice mail server or other messaging system. If a connection is made with a smart phone, or a phone having an associated computer, interfaced through IP network 118, the corresponding router may contain software for performing the necessary processing in conjunction with a voice mail server or other messaging system.

Software for implementing the processing shown in FIG. 2 and described above may be embodied within a computer program product, such as a memory or a storage device or product, including a computer-usable medium having computer readable code embodied therein for use by a computer, or a voice switch or a router, in performing the processing. Components for performing the processing, such as a voice switch or a router, may include modules for performing particular functions, which may include functions described with respect to FIG. 2. These modules may include a software module, a hardware module, or a combination hardware and software module.

While the present invention has been described in connection with a preferred embodiment, many modifications will be readily apparent to those skilled in the art, and this application is intended to cover any adaptations or variations thereof. For example, various other components for the elements shown in FIG. 1 and other types of message indicators may be used without departing from the scope of the invention. This invention should be limited only by the claims and equivalents thereof.

What is claimed is:

1. An apparatus for providing an indication of a message to a phone subscriber, comprising:
   means for receiving the message;
   means for providing an indication of the message at a phone within a group of phones subscribed to by the subscriber; and
   means for providing the indication of the message at a phone subscribed to by a third party.

2. the apparatus of claim 1 wherein the means for providing includes means for providing the indication of the message at at least one of the phones associated with the subscriber.

3. The apparatus of claim 1 wherein the means for providing includes means for providing a visual indication of the message.

4. An apparatus for providing indications of a message to a phone subscriber, comprising:
   means for receiving a message for a first phone of the subscriber and a second phone of the subscriber; and
   means for providing
      a first indication at the first and second phones if the first phone received a call resulting in the message, and
      a second indication at the first and second phones if the second phone received a call resulting in the message.

5. The apparatus of claim 4 wherein the means for providing includes means for providing a visual indication of the message.

6. A system for providing indications of a message to a phone subscriber, comprising:
   a plurality of phones subscribed to by the subscriber;
   a messaging system, interfaced with the plurality of phones, for recording and storing messages; and
   means, coupled to the plurality of phones and the message system, for providing indications of messages for the subscriber, the providing means including:
      means for receiving a message for the phone subscriber;
      means for providing an indication of the message at a phone within the plurality of phones subscribed to by the phone subscriber; and
      means for providing the indication of the message at a phone subscribed to by a third party.

7. The system of claim 6 wherein the means for providing includes means for providing the indication of the message at at least one of the phones subscribed to by the subscriber.

8. The system of claim 6 wherein the means for providing includes means for providing a visual indication of the message.

9. A system for providing indications of a message to a phone subscriber, comprising:
   a plurality of phones subscribed to by a subscriber;
   a messaging system, interfaced with the plurality of phones, for recording and storing messages; and
   means, coupled to the plurality of phones and the message system, for providing indications of messages for the subscriber, the providing means including:
      means for receiving a message for a phone subscriber that subscribes to a first and second phone; and
      means for providing
         a first type of indication at the first and second phones if the first phone received a call resulting in the message, and
         a second type of indication at the first and second phones if the second phone received a call resulting in the message.

10. The system of claim 9 wherein the means for providing includes means for providing a visual indication of the message.

11. A method for providing an indication of a phone subscriber's message comprising the steps of:
   receiving the message;
   providing an indication of the message at a phone within a group of phones subscribed to by the subscriber; and
   providing the indication of the message at a phone subscribed to by a third party.

12. The method of claim 11 wherein the providing step includes the step of providing the indication of the message at at least one of the phones subscribed to by the subscriber.

13. A method of claim 11 wherein the providing step includes the step of providing a visual indication of the message.

14. A method for providing indications of a phone subscriber's message comprising the steps of:
   receiving a message for a phone subscriber that subscribes to a first phone and a second phone; and providing
- a first type of indication at the first and second phones if the first phone received a call resulting in the message, and
- a second type of indication at the first and second phones if the second phone received a call resulting in the message.

15. The method of claim 14 wherein the providing step includes the step of providing a visual indication of the message.

16. An apparatus for providing an indication of a phone subscriber's message, comprising:
- a module for receiving a message for a phone subscriber that subscribes to a plurality of phones;
- a module for providing an indication of the message at at least one of plurality of phones; and
- a module providing the indication of the message at a phone subscribed to by a third party.

17. An apparatus for providing indications of a phone subscriber's message, comprising:
- a module for receiving a message for a phone subscriber that subscribes to a first phone and a second phone; and
- a module for providing
  - a first type of indication at the first and second phones if the first phone received a call resulting in the message, and
  - a second type of indication at the first and second phones if the second phone received a call resulting in the message.

18. A computer program product, comprising:
- a computer usable medium having computer readable code embodied therein for use in providing indications of a phone subscriber's message, the medium including:
- a module for receiving a message for a phone subscriber that subscribes to a plurality of phones;
- a module for providing an indication of the message at at least one of plurality of phones; and
- a module providing the indication of the message at a phone subscribed to by a third party.

19. A computer program product, comprising:
- a computer-usable medium having computer readable code embodied therein for use in providing indications of a phone subscriber's message, the medium including:
  - a module for receiving a message for a phone subscriber that subscribes to a first phone and a second phone; and
  - a module for providing
    - a first type of indication at the first and second phones if the first phone received a call resulting in the message, and
    - a second type of indication at the first and second phones if the second phone received a call resulting in the message.

* * * * *